(12) United States Patent
Smith

(10) Patent No.: US 6,589,497 B2
(45) Date of Patent: Jul. 8, 2003

(54) PROCESS FOR PREPARING SODA ASH FROM SOLUTION MINED BICARBONATE BRINES

(75) Inventor: David E. Smith, Princeton, NJ (US)

(73) Assignee: FMC Wyoming Corporation, Princeton, NJ (US)

( * ) Notice: Subject to any disclaimer, the term of this patent is extended or adjusted under 35 U.S.C. 154(b) by 30 days.

(21) Appl. No.: 09/880,566

(22) Filed: Jun. 13, 2001

(65) Prior Publication Data

US 2002/0192140 A1 Dec. 19, 2002

(51) Int. Cl.$^7$ ................................................ C01D 7/12
(52) U.S. Cl. ...................... 423/421; 423/209; 423/206.2
(58) Field of Search ........................... 423/206.2, 206.1, 423/421, 427, 426, 209; 23/302 T, 297, 298; 299/4, 5

(56) References Cited

U.S. PATENT DOCUMENTS

| 4,039,617 | A | | 8/1977 | Kuo | |
|---|---|---|---|---|---|
| 4,401,635 | A | | 8/1983 | Frint | |
| 4,869,882 | A | | 9/1989 | Dome et al. | |
| 5,262,134 | A | * | 11/1993 | Frint et al. | ................. 23/302 T |
| 5,283,054 | A | | 2/1994 | Copenhafer et al. | |
| 5,609,838 | A | * | 3/1997 | Neuman et al. | ......... 423/206.1 |
| 5,618,504 | A | * | 4/1997 | Delling et al. | ........... 423/206.2 |
| 5,766,270 | A | | 6/1998 | Neuman et al. | |
| 5,955,043 | A | | 9/1999 | Neuman et al. | |
| 6,207,123 | B1 | | 3/2001 | Tanaka et al. | |
| 6,228,335 | B1 | | 5/2001 | Copenhafer et al. | |
| 6,251,346 | B1 | | 6/2001 | Neuman et al. | |
| 6,322,767 | B1 | | 11/2001 | Neuman et al. | |
| 6,428,759 | B1 | * | 8/2002 | Smith et al. | ............. 423/206.2 |

\* cited by examiner

Primary Examiner—Steven Bos
Assistant Examiner—Anthony Kuhar
(74) Attorney, Agent, or Firm—Trask Britt

(57) ABSTRACT

A method for producing high grade soda ash from a solution mined brine containing sodium bicarbonate by processing the mine brine through a monohydrate crystallization step to the final product is described. The mine brine is treated to decompose and thereby convert sodium bicarbonate to sodium carbonate and to concentrate the sodium carbonate to a concentration such that a feed liquor is formed which is suitable for crystallizing sodium carbonate monohydrate crystals of high purity from the feed liquor. The sodium carbonate monohydrate crystals recovered from the process are converted to soda ash by known techniques.

9 Claims, 2 Drawing Sheets

PROCESS FOR PREPARING SODA ASH FROM SOLUTION MINED BICARBONATE BRINES

BACKGROUND OF THE INVENTION

1. Field of the Invention

The present invention generally relates to the recovery of soda ash from aqueous brines. More particularly, the present invention relates to a process for obtaining soda ash from sodium bicarbonate containing solution mined brines.

2. State of the Art

Dry mining and solution mining techniques have been used to recover soda ash from sodium bicarbonate containing ores such as trona and nahcolite. One of the most common processes for producing soda ash from dry mined sodium bicarbonate containing ores is by the monohydrate route, wherein sodium carbonate monohydrate crystals are formed from an aqueous solution containing sodium carbonate. In such a process as practiced at Green River, Wyo., dry mined trona ore is calcined to form a crude soda ash product which is dissolved in water and then clarified and filtered to form an aqueous solution. The aqueous solution is introduced to a sodium carbonate monohydrate crystallizer where water is evaporated to form a slurry of sodium carbonate monohydrate crystals in a mother liquor. The sodium carbonate monohydrate crystals are separated from the slurry and calcined to form a dense soda ash product. Mother liquor separated from the slurry may be recycled to the sodium carbonate monohydrate crystallizer. This type of direct processing of brine through a monohydrate process has generally not been practiced with solution mined brines containing sufficient sodium bicarbonate.

U.S. Pat. No. 4,869,882 to Dome et al. describes a process for treating waste pond solutions containing significant quantities of sodium carbonate and sodium bicarbonate as well as silicates, chlorides and sulfates. Dome neutralizes, clarifies, heats, cools and evaporates such solutions to obtain a liquor having about 17–24% $Na_2CO_3$, from which sodium carbonate decahydrate crystals are produced by cooling. Dome notes that monohydrate crystals cannot be directly obtained from solutions containing significant sulfate contamination since burkeite crystals ($Na_2CO_3.2Na_2SO_4$) are also formed, thereby producing impure monohydrate crystals. Dome indicates this problem is avoided by first producing decahydrate crystals.

In U.S. Pat. No. 4,034,617 to Kuo, a process for treating monohydrate mother liquor in a decahydrate crystallizer is described. Kuo's monohydrate process starts with dry mined, calcined trona which is dissolved in a carbonate mother liquor to form the monohydrate feed stream which contains no significant quantity of sodium bicarbonate. A portion of the monohydrate crystallizer mother liquor, which typically would be purged, is instead fed to a decahydrate crystallizer where decahydrate crystals are formed. As reported in the patent, the decahydrate crystals are substantially free of contaminants. The decahydrate crystals are then heated to melt the crystals to form a hot monohydrate slurry from which monohydrate crystals are separated and sent to a dryer to be converted to soda ash, along with monohydrate crystals from the main monohydrate crystallizer.

A process for recovering soda ash from a sodium carbonate and sodium bicarbonate brine is described in U.S. Pat. No. 5,283,054 to Copenhafer et al. In this process, a sodium bicarbonate and sodium carbonate containing brine derived by solution mining is heated and steam stripped to decompose sodium bicarbonate to sodium carbonate, water and carbon dioxide. The stripped brine is concentrated by evaporation and neutralized with caustic soda to further reduce the sodium bicarbonate concentration in the brine to a very minimal amount to form a brine concentration suitable for crystallization of sodium carbonate decahydrate crystals therefrom. This brine is introduced to a sodium carbonate decahydrate crystallizer where it is cooled to form a slurry of sodium carbonate decahydrate crystals and a mother liquor.

The sodium carbonate decahydrate crystals are separated from the mother liquor, melted and diluted with water to make a nominal 30% by weight sodium carbonate solution. Additional caustic soda may also be added to the solution to further reduce sodium bicarbonate concentrations therein. The solution is crystallized by evaporation of water in a monohydrate crystallizer to form a slurry of sodium carbonate monohydrate crystals in a mother liquor. These monohydrate crystals are separated from the slurry and processed into a dense soda ash product by calcination. The '054 process requires a very large decahydrate crystallizer and significant cooling capability, which requires significant energy. The '054 process may be used where a solution mine brine has a significant impurity content.

Although the available processes may be used to produce soda ash from dry mined or solution mined ore, improvements in the production processes are always desired. Recent improvements in bicarbonate and/or carbonate brines from sodium containing ores, especially with regard to brines resulting from in situ dissolution of such ores, have been directed towards initially forming brines which are suitable for crystallization to form sodium carbonate decahydrate crystals.

SUMMARY OF THE INVENTION

The present invention generally relates to the recovery of sodium values from aqueous brines containing a minimum of impurities. More particularly, the present invention relates to a process for obtaining soda ash from sodium bicarbonate containing solution mined brines via initially forming a brine suitable for feeding to a monohydrate crystallizer.

The invention, more specifically, provides a process for optimizing sodium carbonate monohydrate recovery from a mine brine containing significant quantities of sodium bicarbonate and minimal impurities by evaporating and/or stripping such a mine brine to concentrate sodium values in the mine brine and convert at least a portion of the remaining sodium bicarbonate therein to sodium carbonate to form a concentrated brine. At least a portion of remaining sodium bicarbonate in the concentrated brine is neutralized with hydroxide to form additional sodium carbonate, thereby forming a crystallizable solution of a composition from which monohydrate crystals of sodium carbonate will form upon evaporation of water from the crystallizable solution in a monohydrate crystallizer at a temperature of from about 35° C. to about 109° C. A slurry is formed in the crystallizer comprising sodium carbonate monohydrate crystals and a mother liquor containing dissolved sodium carbonate in a concentration suitable, optionally, as feed to a sodium carbonate decahydrate crystallizer.

The sodium carbonate monohydrate crystals are separated from the mother liquor to recover the mother liquor apart from the sodium carbonate monohydrate crystals. In one embodiment of the invention, at least a portion of the mother liquor is fed to a sodium carbonate decahydrate crystallizer to crystallize sodium carbonate decahydrate crystals as a slurry in a decahydrate mother liquor which is separated from the sodium carbonate decahydrate crystals. The decahydrate crystals are recycled to the monohydrate crystallizer. Either of the mother liquors may be recycled to form part of the aqueous solvent provided that the level of impurities in the resulting mine brine is controlled within predetermined levels.

The initial recovery of monohydrate crystals, especially when accompanied by secondary recovery of decahydrate crystals which are recycled to the monohydrate crystallizer, optimizes recovery of monohydrate crystals in a manner which is energy and equipment efficient. Coprecipitation of burkeite crystals is generally avoided by utilizing a monohydrate crystallizer feed stream which has a relatively low sulfate content, accompanied by a relatively low level of sodium chloride. Burkeite is a double salt of sodium carbonate and sodium sulfate ($Na_2CO_3 \cdot 2Na_2SO_4$). Increasing NaCl concentration decreases the tolerable level of $Na_2SO_4$ to prevent burkeite formation. Cocrystallization of burkeite can result in unacceptable high levels of sulfate in the final soda ash product.

Other features and advantages of the present invention will become apparent to those of skill in the art through a consideration of the ensuing description, the accompanying drawings, and the appended claims.

DETAILED DESCRIPTION OF THE INVENTION

The present invention generally relates to the recovery of soda ash from aqueous brines. More particularly, the present invention relates to a process for obtaining commercial grade soda ash from sodium bicarbonate containing solution mined brines which contain minimal impurities, especially sulfate and chloride impurities, by direct processing to a monohydrate crystallizer.

Figure 1:
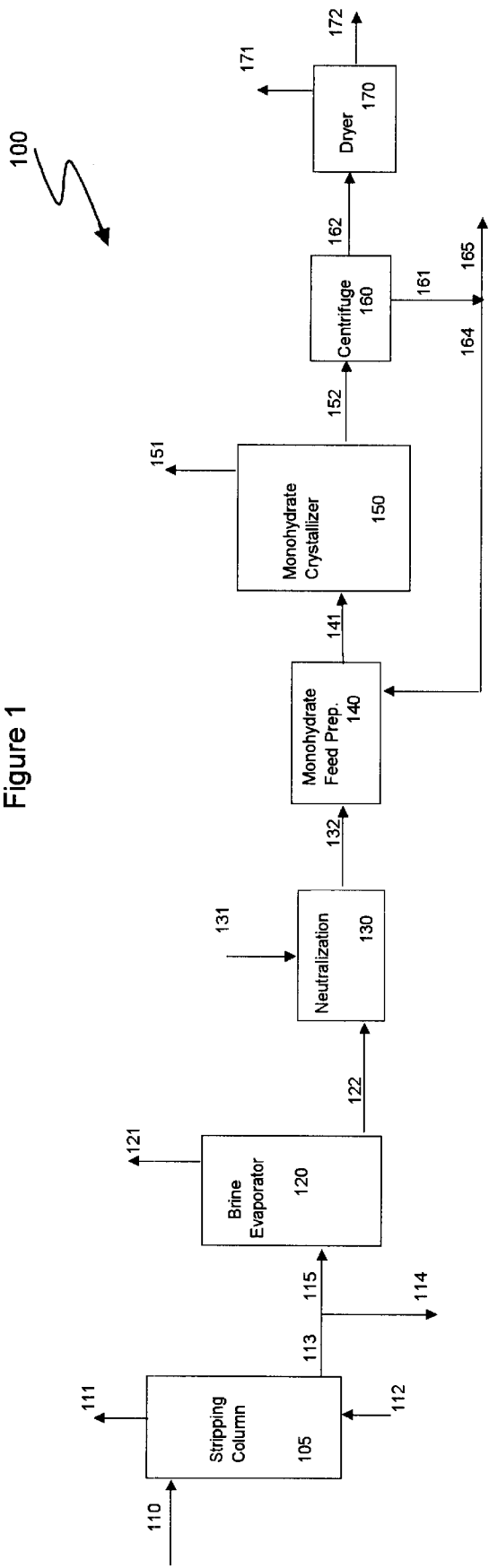
FIG. 1 is a schematic flow diagram for an improved process for the production of soda ash from an aqueous solution containing at least some sodium bicarbonate.

One embodiment of the present invention is illustrated in FIG. 1 as process 100. Generally, an aqueous brine 110 containing sodium bicarbonate and minimal impurities is stripped of carbon dioxide via contact with steam 112 to convert sodium bicarbonate into sodium carbonate within a stripping device, such as stripping column 105. The aqueous brine 110 is preferably obtained by in situ solution mining of a trona, nahcolite or similar ore body with an aqueous solvent containing minimal impurities, especially sulfate and chloride ions. Evaporator feed brine 115 is then concentrated in a brine evaporator 120 to produce a concentrated solution 122. The addition of caustic soda 131 to the concentrated solution 122 further reduces the sodium bicarbonate concentration in the concentrated solution 122, forming neutralized brine 132. Neutralized brine 132, which preferably contains less than 2% by weight sodium bicarbonate, is combined with mother liquor 164 from a sodium carbonate monohydrate crystallization step to form a sodium carbonate monohydrate feed brine 141 which is introduced to a sodium carbonate monohydrate crystallizer 150. Water is evaporated from the sodium carbonate monohydrate feed solution 141 in the sodium carbonate monohydrate crystallizer 150 to form a slurry 152 of sodium carbonate monohydrate crystals in a mother liquor. A portion of the slurry 152 is removed to centrifuge 160, or similar liquid-solids separation device, which separates the mother liquor 161 from the sodium carbonate monohydrate crystals 162. The sodium carbonate monohydrate crystals 162 may be calcined in dryer 170 to form a dense soda ash product 172. A portion of the mother liquor 161 separated in centrifuge 160 may be recycled to the sodium carbonate monohydrate crystallizer 150 via stream 164, and a portion of mother liquor 161 may be purged from process 100 through stream 165 to prevent impurities from building up to unacceptable levels in the sodium carbonate monohydrate crystallizer mother liquor.

Although a portion of the monohydrate mother liquor may be recycled to the ore body to act as a solvent, it is generally preferred that the solvent applied to the ore body contain sufficient clean water so that the solution mined brine contains minimal impurities. Clean water is defined herein as water containing minimal concentrations of metal chlorides or metal sulfates, which, ideally, is condensate from process evaporation, but also includes groundwater and surface water, including river water. It is important in the process of the instant invention that the aqueous brine 110 contains minimal chloride and/or sulfate impurities.

Figure 2:
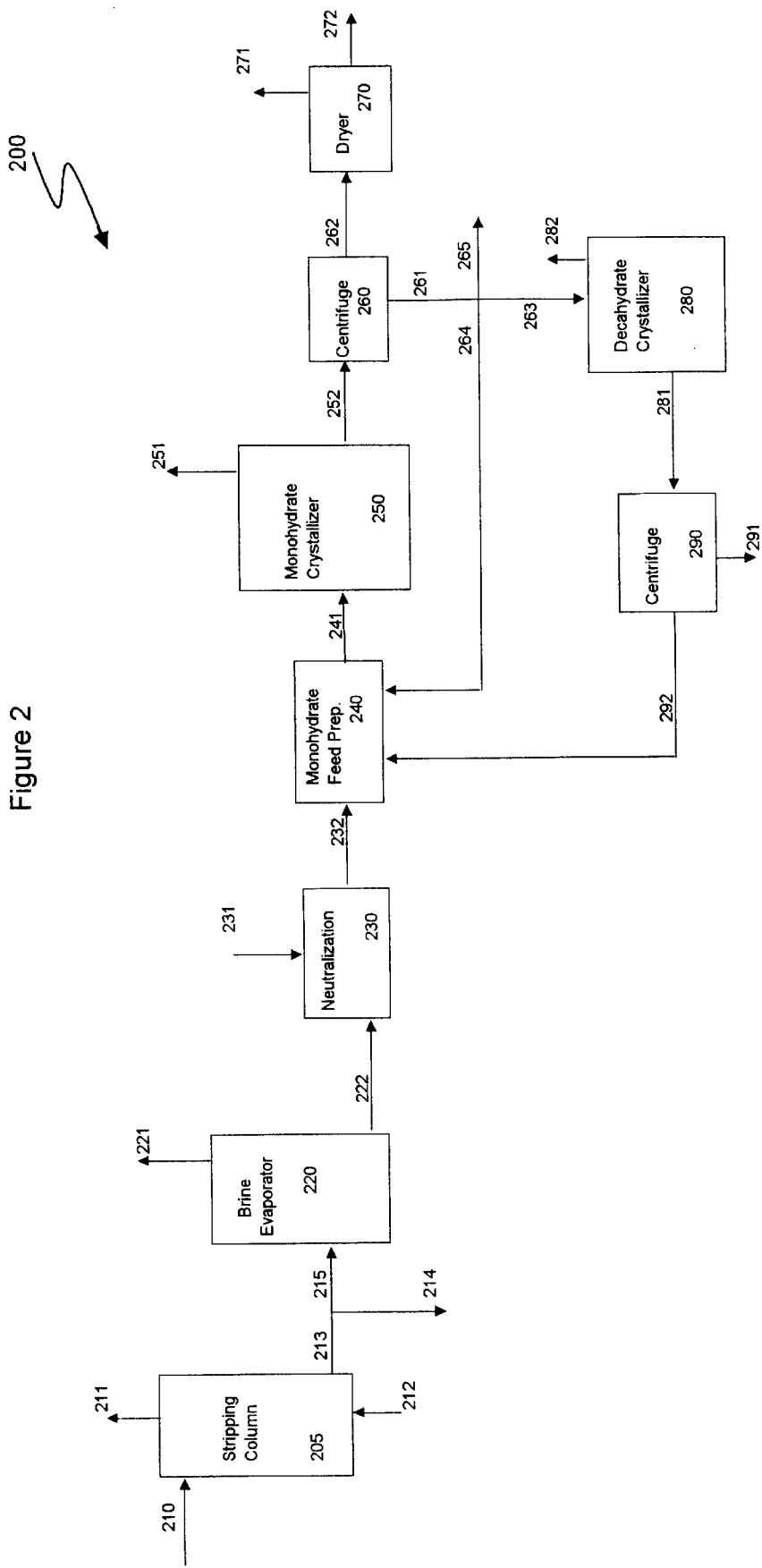
FIG. 2 is a schematic flow diagram for a process of the type illustrated in FIG. 1 additionally including a sodium carbonate decahydrate crystallizer.

Another embodiment of the invention is shown in FIG. 2 as process 200. Generally, an aqueous brine 210 containing sodium bicarbonate is stripped of carbon dioxide with steam 212 to convert sodium bicarbonate into sodium carbonate and $CO_2$ 211 within a stripping device, such as stripping column 205. Evaporator feed brine 215 comprising stripped brine 213 less purged brine 214, is then concentrated in a brine evaporator 220 to produce a concentrated solution 222. Water vapor is released from brine evaporator 220 as stream 221. The addition of caustic soda 231 to the concentrated solution 222 in neutralization circuit 230 further reduces the sodium bicarbonate concentration in the concentrated solution 222, forming a neutralized brine 232. Neutralized brine 232 is combined with sodium carbonate decahydrate crystals 292 and monohydrate mother liquor 264 from a sodium carbonate monohydrate crystallization process to form a sodium carbonate monohydrate feed brine 241 which is introduced to a sodium carbonate monohydrate crystallizer 250. Water is evaporated from the solution in the sodium carbonate monohydrate crystallizer 250 to form a slurry 252 of sodium carbonate monohydrate crystals in a monohydrate mother liquor. A portion of the slurry 252 is removed to centrifuge 260 or other separation device to separate the mother liquor 261 from the sodium carbonate monohydrate crystals 262. The sodium carbonate monohydrate crystals 262 may be calcined in dryer 270 to form a dense soda ash product 272.

A portion of the monohydrate mother liquor 261 separated in the centrifuge 260 is introduced to a sodium carbonate decahydrate crystallizer 280 as feed stream 263. Any remaining mother liquor 264 may be returned to the sodium carbonate monohydrate crystallizer 250. A slurry 281 of sodium carbonate decahydrate crystals in their mother liquor flows from sodium carbonate decahydrate crystallizer 280 to a separator such as centrifuge 290. Sodium carbonate decahydrate crystals separated from their mother liquor in centrifuge 290, or other liquid-solids separators including various types of filters, are recycled to sodium carbonate monohydrate crystallizer 250 via sodium carbonate decahydrate crystal stream 292. At least a portion of the sodium carbonate decahydrate mother liquor separated from the sodium carbonate decahydrate crystals in centrifuge 290 is removed from process 200 via stream 291. Also, a portion of the sodium carbonate decahydrate mother liquor may be recycled (not shown) back to sodium carbonate decahydrate crystallizer 280 to control generally the density (quantity) of crystals within the crystallizer. Typically, the decahydrate mother liquor is not combined with the aqueous solvent fed to the ore body since the concentration of impurities in the decahydrate mother liquor is generally too high.

More specifically, with reference to FIG. 1, the aqueous brine 110 is preferably a brine derived from solution mining a sodium bicarbonate containing ore such as trona or nahcolite. A preferred aqueous brine 110 for use in process 100 of the present invention comprises at least about 10% by weight total alkali, of which at least about 2% by weight of aqueous brine 110 is sodium bicarbonate. The term "total alkali," as used herein, is the combined total of sodium carbonate and sodium bicarbonate with the sodium bicarbonate expressed on an equivalent sodium carbonate basis. Additional impurities may also be present in aqueous brine 110. For example, a brine recovered from solution mining trona or nahcolite may also contain up to about 2.0% by weight sodium chloride, up to about 1.0% by weight sodium sulfate and up to about 0.3% by weight dissolved organics, especially if significant quantities of such impurities are present in the aqueous solvent used to leach carbonate and bicarbonate from such ore bodies. The aqueous solvent may contain impurities at significant levels when process liquors are recycled to become part of the solvent. Iron compounds may also be present. Non-soluble impurities, or other suspended solids present in the aqueous brine 110, may be removed from the aqueous brine 110 by filtration, clarification, settling, or other methods known in the art before the introduction of the aqueous brine 110 to the present process 100. Furthermore, the aqueous brine 110, if at elevated temperatures, may be flashed to evaporate water and to release gases including $CO_2$ as stream 111, further increasing the concentration of sodium carbonate in the aqueous brine 110. Flashing may be used more often in situations where nahcolite is the mined ore. Flashing generally involves exposing a hot brine to a zone of reduced pressure. It is a technique generally known in the art.

Once recovered and prepared for the process 100 of the present invention, the aqueous brine 110 is introduced to a stripping device, for example, stripping column 105, near the top of the column. Preferably, stripping column 105 is operated countercurrently and contains random or structural packing material. Steam 112 is also introduced to the stripping column 105, preferably near the bottom of the column to facilitate the decomposition of sodium bicarbonate in the aqueous brine 110 to sodium carbonate, water, and carbon dioxide, as known in the art. Water vapor and carbon dioxide exit the top of the stripping column 105 as stream 111 while the stripped brine 113 exits the bottom of the stripping column 105.

Typically, the stripping column 105 is operated at a temperature between about 90° C. and about 140° C., and more preferably between about 105° C. and about 120° C. To help maintain operating conditions, the aqueous brine 110 may be preheated to a temperature close to the operating temperature of the stripping column 105 before being introduced therein.

Although the use of a stripping device is illustrated and explained with reference to a preferred embodiment of the present invention, it is understood that stripping the aqueous brine 110 in a stripping device is an optional, although generally preferred, step in the process. Use of a stripping device may depend upon the operational costs of the process, the availability of steam, and other operational factors that one of ordinary skill in the art would understand when deciding whether or not to include the stripping column 105 described herein. For example, more of the stripping function may be shifted to the concentration and neutralization steps. Stripping, however, is a very effective step when economical quantities of steam are available. A combined concentrator-stripper may be utilized.

All of stripped brine 113 recovered from the stripping column 105 may be introduced to a brine evaporator 120. Alternatively, stripped brine 113 may be separated into two streams, an evaporator feed brine 115 and a stripped brine stream 114 which may be used in other production processes. For example, stripped brine stream 114 may be used in the production of caustic soda (not shown). Evaporator feed brine 115 is introduced to brine evaporator 120.

Various types of evaporators may be used as brine evaporator 120. For example, the brine evaporator 120 may be a forced circulation evaporator or a falling film evaporator, including evaporators having single effects, multiple effects, or vapor recompression. Preferably, the brine evaporator 120 is operated at a temperature between about 90° C. and 140° C., and more preferably between about 105° C. and about 120° C., to evaporate water from the evaporator feed brine 115 introduced to the brine evaporator 120. The evaporator is typically run hotter than the stripping column in order to effectuate additional bicarbonate decomposition. The evaporation of water from the evaporator feed brine 115 concentrates the evaporator feed brine 115 to form a concentrated solution 122 exiting the brine evaporator 120. Furthermore, additional sodium bicarbonate decomposition occurs within the brine evaporator 120, further concentrating carbonate values in the solution therein. The water vapors and other gases formed in the brine evaporator 120 are released as stream 121. Stream 121 may be used as a source of steam 112 for the stripping column 105.

Preferably, the brine evaporator 120 concentrates the evaporator feed brine 115 to the maximum practical extent without exceeding solubility limits of sodium bicarbonate or sodium carbonate. Sodium bicarbonate concentrations in the concentrated solution 122 are preferably minimized while the sodium carbonate concentrations are maximized. For instance, the sodium bicarbonate concentration of the concentrated solution 122 leaving the brine evaporator 120 may be about 6% or less by weight and is preferably about 5% or less sodium bicarbonate by weight with concentrations of less than about 4% being more preferable. Generally, the total amount of dissolved solids in the concentrated solution 122 usually cannot exceed approximately 31% to 32% by weight at a temperature above about 90° C. if precipitation of sodium alkali compounds is to be avoided.

Caustic soda 131 is preferably added to concentrated solution 122 in a neutralization step 130 to produce neutralized brine 132. The caustic soda 131 reacts with the remaining sodium bicarbonate in the concentrated solution 122 to form water and sodium carbonate. Typically, an aqueous solution of caustic soda 131, also known as sodium hydroxide, having a concentration of about 3% to about 50% by weight sodium hydroxide is added to the concentrated solution 122 to reduce the sodium bicarbonate concentration therein. Sufficient amounts of caustic soda 131 are added to reduce the sodium bicarbonate concentration of the neutralized brine 132 to about 2% by weight or less, and preferably to about 1.0% or less by weight maximum sodium bicarbonate concentration. Also, the preferable maximum sodium hydroxide concentration in the neutralized brine 132 or 232 is about 1% by weight sodium hydroxide, more preferably about 0.5% maximum sodium hydroxide by weight. If the caustic soda is made by the lime causticization route, then these desired concentrations may be achieved in the neutralized brine 132 by the addition of a caustic soda 131 having about 3% to about 12% by weight sodium hydroxide and preferably about 8% to about 12% by weight sodium hydroxide. The use of both a stripping column and an evaporator to reduce sodium bicarbonate concentrations in the concentrated solution 122 minimizes the amount of caustic soda which must be added to achieve the desirable low levels of sodium bicarbonate in the neutralized brine 132. Optionally, caustic soda may be advantageously added to the monohydrate mother liquor being recycled to the monohydrate crystallizer.

Although not illustrated, the caustic soda 131 for the present process may be prepared by the lime causticization of a portion of the feed brine 110 diverted for caustic production or, preferably, by the lime causticization of stripped brine stream 114. A portion of the concentrated solution 122 could also be used to produce caustic soda 131 if the concentrated solution 122 was first diluted to less than 20% by weight total alkali in order to avoid pirssonite precipitation during causticization. The formation of caustic soda 131 is well known in the art; for example, see U.S. Pat. No. 5,283,054 Copenhafer et al., which discusses various aspects, including pirssonite formation and, therefore, will not be explained further herein.

The addition of caustic soda 131 to the concentrated solution 122 can introduce impurities into the neutralized brine 132. Therefore, the neutralized brine 132 is preferably filtered to remove insolubles before being introduced to a sodium carbonate monohydrate crystallizer. Furthermore, the neutralized brine 132 may be treated with activated carbon to reduce the amount of organic matter found in the neutralized brine 132. Carbon treatment may be used on any of the feed streams in process 100 to reduce the amount of organic matter in the process. After treatment with carbon, any suspended carbon in the carbon-treated solution is preferably filtered out of the system before further processing. Sodium sulfate and sodium chloride and silicia impurities may also be introduced from lime during neutralization, which is one reason why stripping is a desirable step preceding concentration and neutralization to reduce the amount of caustic soda required for neutralization.

More specifically, neutralized brine 232, in the process of FIG. 2, is mixed with sodium carbonate decahydrate crystals 292 to form a sodium carbonate monohydrate feed brine 241. Because the temperature of the neutralized brine 232 is elevated, the sodium carbonate decahydrate crystals 292 melt and dissolve into the neutralized brine. Melting the sodium carbonate decahydrate crystals 292 into the neutralized brine 232 increases the sodium carbonate concentration of the sodium carbonate monohydrate feed brine 241 because pure, dry, sodium carbonate decahydrate crystals 292 contain about 37% by weight sodium carbonate, the remaining 63% comprising the ten waters of hydration. Of course, the sodium carbonate decahydrate crystals used in the present process are wet; thus, the amount of sodium carbonate in the sodium carbonate decahydrate crystals is somewhat less than 37% by weight. By increasing the sodium carbonate concentration of the sodium carbonate monohydrate feed brine 241, the amount of evaporation required for crystallization in the sodium carbonate monohydrate crystallizer 250 is significantly reduced, thereby providing an advantage over other sodium carbonate monohydrate crystallization processes. Furthermore, the ten waters of hydration provided by the decahydrate crystals contain few impurities, especially chlorides and organics, and thus dilute the concentration of such impurities in the monohydrate crystallizer, thereby aiding in providing a purer monohydrate crystal product since any mother liquor wetting such crystals has a reduced concentration of impurities. Sulfates are generally minimized in the decahydrate crystals but not necessarily eliminated. Thus, the process of the present invention has advantages in comparison to other sodium carbonate monohydrate crystallization processes. The neutralized brine 232 (FIG. 2) and the sodium carbonate decahydrate crystals 292 may be mixed in a sodium carbonate monohydrate feed preparation unit 240.

Sodium carbonate monohydrate mother liquor 264 (FIG. 2) may also be added to the neutralized brine 232 and sodium carbonate decahydrate crystals 292 to form the sodium carbonate monohydrate feed brine 241. Alternatively, the sodium carbonate monohydrate mother liquor 264 may be recycled directly to the sodium carbonate monohydrate crystallizer 250. Feed preparation 240 may be done in the neutralizer 230.

Water is evaporated from the sodium carbonate monohydrate feed brine 141 (FIG. 1) within the sodium carbonate monohydrate crystallizer 150 to form a slurry of sodium carbonate monohydrate crystals in a mother liquor. Hot water vapor, $CO_2$ and other gases escape the sodium carbonate monohydrate crystallizer 150 as stream 151, which may be used as a source of steam 112 for the stripping column 105. In a mechanical vapor recompression evaporator circuit, stream 151 may be compressed before being introduced into stripping column 105.

Many different types of sodium carbonate monohydrate crystallizers 150 (FIG. 1) may be used to carry out the process of the present invention. For example, the sodium carbonate monohydrate crystallizer 150 may be a multiple effect evaporator operating between about 60° C. and about 109° C. A vapor recompression designed sodium carbonate monohydrate crystallizer 150, however, may operate between about 100° C. and about 109° C.

A portion of the slurry in the monohydrate crystallizer is continuously removed as slurry 152 (FIG. 1) from the sodium carbonate monohydrate crystallizer 150 and introduced to a centrifuge 160 to separate the sodium carbonate monohydrate crystals 162 from the sodium carbonate monohydrate mother liquor 161. Other separation apparatuses, such as hydrocyclones, filters, settling tanks, or the like, may also be used, in addition to or instead of centrifuge 160, to separate the sodium carbonate monohydrate crystals 162 from the sodium carbonate monohydrate mother liquor 161.

The sodium carbonate monohydrate crystals 162 (FIG. 1) may be introduced to a dryer 170 where they are dehydrated to produce a dense soda ash product 172 and vapor stream 171. The drying of the sodium carbonate monohydrate crystals 162 may also be effected in a fluidized bed, a rotary dryer, a rotary kiln, or other drying apparatus. Prior to drying, the sodium carbonate monohydrate crystals 162 may be washed (not shown) with clean water or an aqueous alkali solution to displace mother liquor 161 adhering to the sodium carbonate monohydrate crystals 162 before they are dehydrated. Washing away adhered mother liquor lessens the impurities present in the final soda ash product.

The sodium carbonate monohydrate mother liquor 161 (FIG. 1) separated from slurry 152 may be put to many uses. A portion of the sodium carbonate monohydrate mother liquor 161 may be purged from the process 100 as purge stream 165. The amount of sodium carbonate monohydrate mother liquor 161 purged as purge stream 165 depends on several factors, including the amounts of sodium bicarbonate, sodium chloride, sodium sulfate and organic material found in the sodium carbonate monohydrate crystallizer feed brine 132.

Another portion of the sodium carbonate monohydrate mother liquor 261 (FIG. 2), according to another aspect of the instant invention, is preferably diverted to a sodium carbonate decahydrate crystallizer 280 as sodium carbonate decahydrate feed brine 263. The remaining sodium carbonate monohydrate mother liquor 264 is either combined with the neutralized brine 232 and sodium carbonate decahydrate crystals 292 or recycled directly to the sodium carbonate monohydrate crystallizer 250 (not shown).

It is understood that sodium carbonate monohydrate mother liquor may also be recovered from a quiescent, relatively crystal-free zone in a sodium carbonate monohydrate crystallizer 150 (FIG. 1), such as from behind a baffle in the crystallizer. The amount of sodium carbonate monohydrate mother liquor 164 recycled back to sodium carbonate monohydrate crystallizer 150 is limited by the build up of impurities in the sodium carbonate monohydrate crystallizer mother liquor. For instance, certain organic impurities present in brine feed 110 can become concentrated to the point where they cause unacceptable foaming in sodium carbonate monohydrate crystallizer 150 or undesirably alter the crystal habit of the sodium carbonate monohydrate. Impurities including chloride and sulfate compounds in brine feed 110 or caustic soda 131 will also become concentrated in the sodium carbonate monohydrate crystallizer mother liquor, and mother liquor adhering to sodium carbonate monohydrate crystals 162 exiting centrifuge 160, unless removed, will reduce the purity of final soda ash product 172. The sulfate concentration in the sodium carbonate monohydrate crystallizer mother liquor is generally kept below about 3.3% sodium sulfate to avoid burkeite from coprecipitating with sodium carbonate monohydrate. The amount of sulfate that can be present in the sodium carbonate monohydrate mother liquor without burkeite precipitation decreases with increasing chloride concentration. For example, burkeite precipitation occurs in sodium carbonate monohydrate crystallizer mother liquor at 100° C. when the sodium sulfate concentration reaches about 3.3% with no sodium chloride present, while at about 2% sodium sulfate concentration burkeite precipitation occurs when about 5% sodium chloride is present in the mother liquor.

Monitoring of the sodium sulfate levels during processing according to the invention is generally desirable. The level is preferably monitored near or in the monohydrate crystallizer. The feed stream or the mother liquor may be readily monitored to determine sulfate levels and appropriate levels then maintained by one or more techniques, such as 1) purging monodyrate mother liquor, 2) crystallizing decahydrate crystals (Process 200) and purging decahydrate mother liquor as necessary, 3) recycling less mother liquor to be included in the aqueous solvent and/or 4) including more clean water in the aqueous solvent.

The sodium carbonate decahydrate feed brine 263 (FIG. 2) is introduced to a sodium carbonate decahydrate crystallizer 280 where it is cooled to form a slurry of sodium carbonate decahydrate crystals in a sodium carbonate decahydrate mother liquor. Water vapors exit the sodium carbonate decahydrate crystallizer 280 as stream 282 if evaporative crystallization is occurring. Examples of the types of sodium carbonate decahydrate crystallizers 280 which may be used include forced circulation cooling crystallizers, evaporative cooling crystallizers, scraped surface cooling crystallizers, or any combination of one or more of such devices. Typically, the sodium carbonate decahydrate crystallizer 280 is operated at between about 2° C. and 25° C., and more preferably between about 10° C. and about 20° C. The yield of sodium carbonate decahydrate crystals generally increases as the operating temperature of the sodium carbonate decahydrate crystallizer 280 decreases. Operation at low temperatures may, depending upon the composition of the feed stream, result in crystallization of unwanted crystal species.

A portion of the slurry 281 (FIG. 2) is withdrawn from the sodium carbonate decahydrate crystallizer 280 and introduced to a centrifuge 290, or other suitable liquid-solids separation device. Sodium carbonate decahydrate crystals 292 are separated from slurry 281 and are melted and dissolved in the hot, neutralized brine 232. The sodium carbonate decahydrate mother liquor separated from slurry 281 is either recycled to the sodium carbonate decahydrate crystallizer 280 or purged via purge stream 291, or both. Water or aqueous alkali solution may be added to the decahydrate crystallizer to minimize or avoid co-crystallization of sodium bicarbonate with the sodium carbonate decahydrate crystals in Process 200.

EXAMPLES

Example 1

In a representative example of process 100, a feed brine 110 is generated by introducing clean water at 32° C. into a section of an underground trona mine in a solution mining process. The pregnant liquor (mine brine) recovered from the solution mining operation typically analyzes about 15% sodium carbonate, about 4.5% sodium bicarbonate, about 0.04% sodium chloride, about 0.02% sodium sulfate, and about 0.01% total organic carbon. The pregnant liquor is clarified to remove any solids and then heated to 115° C. in a shell and tube heat exchanger with steam to form feed brine 110. Process 100 is a continuous process. Feed brine 110 is introduced at a 500 ton/hour flow rate to the top of a packed stripping column 105. Steam 112 enters the bottom of the stripping column 105 and flows upward through the packing material. Water vapor and carbon dioxide exit the top of the stripping column as stream 111. The stripped brine 113 exits the bottom of the stripping column 105 at a temperature of about 115° C.

The sodium bicarbonate content of the feed brine 110 is reduced by about 25% in the stripping column 105. Most of the stripped brine 113 is fed to the brine evaporator 120 as evaporator feed brine 115. A portion of the stripped brine 113, in this Example 1, is diverted as stream 114 at a 55 ton/hour rate to a lime causticization circuit to make an 8% sodium hydroxide solution. The evaporator feed brine 115 is concentrated at a temperature of about 120° C. in the brine evaporator 120. The amount of sodium bicarbonate is further reduced in the brine evaporator 120 and 30% of the sodium bicarbonate which entered in evaporator feed brine 115 is decomposed. Water vapor and carbon dioxide leave the brine evaporator 120 as stream 121. The concentrated solution 122 that leaves brine evaporator 120 flows at a rate of 280 ton/hour and contains about 24.3% by weight sodium carbonate, about 3.8% by weight sodium bicarbonate, about 0.5% by weight sodium chloride and about 0.3% by weight sodium sulfate.

An 8% caustic soda 131 solution from the lime causticization operation is mixed with the concentrated solution 122 in neutralization step 130 to lower the sodium bicarbonate concentration typically to about 0.001% by weight. Greater concentrations of sodium bicarbonate can readily be processed; however, levels below about 2%, by weight, are generally desirable. The neutralized solution is then filtered to remove any muds or solids to produce 349 ton/hour of neutralized brine 132.

The neutralized brine 132 is mixed with recycled mother liquor 164 to form sodium carbonate monohydrate feed brine 141. The sodium carbonate monohydrate feed brine 141 is introduced to a sodium carbonate monohydrate crystallizer 150, which in this example is a mechanical vapor recompression type of evaporator operating at 101° C. Water leaves the sodium carbonate monohydrate crystallizer 150 as stream 151. A slurry 152 of sodium carbonate monohydrate crystals suspended in mother liquor is continuously withdrawn from the sodium carbonate monohydrate crystallizer 150. The sodium carbonate monohydrate crystals 162 are separated from the mother liquor 161 in centrifuge 160.

The sodium carbonate monohydrate crystals 162 are washed in the centrifuge 160 with water and then conveyed to dryer 170. For the purpose of this example, a fluidized bed type dryer with internal steam coils and a bed operating temperature of 150° C. is utilized. Water vapor leaves the dryer as stream 171. A dense soda ash product 172 exits the dryer 170 at a 71 ton/hour rate. This dense soda ash product 172 contains about 0.05% sodium chloride and about 0.02% sodium sulfate, which is well below the upper limits for such impurities in a typical commercial grade soda ash product. Mother liquor 161 from the centrifuge 160 contains some wash water from washing sodium carbonate monohydrate crystals 162. Most of the mother liquor 161 is recycled back to the sodium carbonate monohydrate feed preparation unit 140 as mother liquor.

To avoid burkeite precipitation in the sodium carbonate monohydrate crystallizer 150, some of the mother liquor 161 is withdrawn as stream 165 and purged from process 100. Purge stream 165 in this Example 1 is typically at a rate up to about 50 ton/hour and contains about 13 ton/hour of total alkali. Purging impurities from Process 100 via stream 165 keeps mother liquor 161 at a preferred maximum concentration of about 2.0% sodium sulfate and about 3.9% sodium chloride while operation at lower limits is generally preferred to produce a final soda ash product with less than 0.2% by weight sulfate. Purging may also be necessary when the aqueous feed brine 110 contains higher iron content to avoid high iron content in the final product. Levels of iron in soda ash are preferably less than about 0.002%. The amount of purging necessary depends upon the level of impurities in the ore deposit, the amount of impurity-laden liquors recycled within the process and the amount of impurities in the aqueous solvent.

Compared generally to prior art processes, process 100 eliminates the cooling and sodium carbonate decahydrate crystallization steps and associated equipment used with neutralized brine as has generally been practiced with brines produced by in situ solution mining of bicarbonate-containing ore bodies. This reduces the capital and operating cost for process 100 compared to the prior art without compromising the purity of the final soda ash product.

Example 2

Process 200 includes a secondary crystallizer step which provides an improvement in soda ash yield over process 100 but with some added equipment. The improved yield for process 200 results from the addition of a sodium carbonate recovery and recycle step to process 100 to reduce the amount of soda ash values purged from the process. In comparing FIG. 1 and FIG. 2, it is seen that process 100 and process 200 are identical through the brine neutralization step. The numbering of the steps and streams are equivalent in FIG. 1 and FIG. 2, i.e., step 105 in FIG. 1 is equivalent to step 205 in FIG. 2.

In the following description of process 200 as shown in FIG. 2, the flow rates and compositions of all streams are identical to their counterparts in Example 1 through neutralized and filtered brine stream 232 (stream 132 in FIG. 1). In process 200, 349 ton/hour of neutralized brine 232 is mixed with sodium carbonate decahydrate crystals 292 and agitated to facilitate the dissolution of the sodium carbonate decahydrate crystals 292 in the hot, neutralized brine 232. Recycled mother liquor 264 is also added to the neutralized brine 232. A sodium carbonate monohydrate feed brine 241 is formed from the addition of the neutralized brine 232, the sodium carbonate decahydrate crystals 292, and the recycled mother liquor 264. The sodium carbonate monohydrate feed brine 241 is introduced to a sodium carbonate monohydrate crystallizer 250, which in this Example (as in Example 1) is a mechanical vapor recompression type of evaporator operating at about 101° C.

Water vapor leaves the sodium carbonate monohydrate crystallizer 250 as stream 251. A slurry 252 of sodium carbonate monohydrate crystals suspended in mother liquor is continuously withdrawn from the sodium carbonate monohydrate crystallizer 250. The sodium carbonate monohydrate crystals 262 are separated from the mother liquor 261 in centrifuge 260. The sodium carbonate monohydrate crystals 262 are washed in the centrifuge 260 with water and then conveyed to dryer 270. For the purpose of this Example, a fluidized bed type dryer with internal steam coils and a bed operating temperature of 150° C. is utilized. Water vapor leaves the dryer as stream 271. A dense soda ash product 272 exits the dryer 270 at a flow rate of 80 ton/hour. The dense soda ash product 272 contains about 0.04% sodium chloride and about 0.02% sodium sulfate.

Mother liquor 261 from the centrifuge 260 contains some wash water from washing sodium carbonate monohydrate crystals 262. Most of the mother liquor 261 is recycled back to the sodium carbonate monohydrate feed preparation unit 240 as mother liquor stream 264. In this Example, none of the sodium carbonate monohydrate mother liquor 261 is purged as purge stream 265. To avoid burkeite precipitation in the sodium carbonate monohydrate crystallizer 250, some of the mother liquor 261 is withdrawn as a sodium carbonate decahydrate feed brine 263. Mother liquor 261 may be allowed to concentrate to about 1.9% sodium sulfate and about 3.0% sodium chloride without significant burkeite crystallization occurring.

The sodium carbonate decahydrate feed brine 263 is introduced at a 67 ton/hour rate to a sodium carbonate decahydrate crystallizer 280. For the purpose of this Example, a scraped surface type of cooling crystallizer operating at 15° C. is especially useful. A slurry 281 of sodium carbonate decahydrate crystals suspended in its mother liquor is continuously removed from sodium carbonate decahydrate crystallizer 280. Sodium carbonate decahydrate crystals 292 are separated from the mother liquor 291 in filter 290 and washed with water. For purposes of this Example, a vacuum belt filter is desirably used. The mother liquor exits the filter as stream 291, which contains some wash water from washing the sodium carbonate decahydrate crystals. Stream 291 exits process 200 at a 27 ton/hour rate, and it contains 3 ton/hour of total alkali. The sodium carbonate decahydrate crystals 292 are mixed with the neutralized brine 232.

In comparing Example 1 and Example 2, it is observed that Process 200 produces about 13% more soda ash product. This is accomplished by crystallizing sodium carbonate decahydrate from a relatively small stream. Compared to the prior art described in U.S. Pat. No. 5,283,054, the stream from which decahydrate is being crystallized in Process 200 is about one-fifth the size of the decahydrate crystallized feed stream in the prior art, which means that the decahydrate crystallizer in process 200 may be considerably smaller while significantly increasing soda ash yield without sacrificing purity.

The amount of mother liquor purged from any of the crystallization-separation steps employed in the instant invention will depend upon the impurities contained in the recovered mine brine. Significant quantities of such mother liquor may be included as part or all of the applied aqueous solvent since the ore body cavity enlarges with continuous leaching to form an ever larger underground lake which provides a dilution effect to impurities in the aqueous solvent. Also, underground streams may enter the underground cavity to add further dilution.

The method of the instant invention may be utilized successfully to solution mine any sodium bicarbonate containing ore body to produce commercial grade soda ash with a monohydrate process. The above examples describe with particularity the mining of a trona deposit. Nahcolite may be similarly solution mined and processed. Generally, mine brine recovered from a nahcolite ore body contains minimal sodium carbonate when clean water is used as the aqueous solvent although substantial quantities may be present if a hot (>100° C.) solvent is used. A lower total alkali content may be present in the crystallizer feed stream from a nahcolite mine brine unless more concentration is conducted. However, if recycled mother liquor from a crystallization step is included in the aqueous solvent, then the recovered mine brine from a nahcolite deposit will have significant quantities of both sodium carbonate and sodium bicarbonate present and the total alkali content of a mine brine from a trona or nahcohite deposit will be similar.

Thus, regardless of the exact nature of the ore body being solution mined, it is a preferred practice of the invention to maintain the amount of sodium bicarbonate in the monohydrate crystallizer feed stream at a sufficiently low level to minimize, or avoid, crystallization of sodium bicarbonate or sodium sesquicarbonate crystals and to maintain the sodium sulfate or sodium chloride impurity level at a sufficiently low level that the final soda ash product has a low sodium sulfate or sodium chloride content. The techniques utilized to avoid, or to minimize burkeite crystallization, for example, are the same regardless of whether the ore is trona or nahcolite.

The aqueous solvent used to dissolve an ore body in accordance with the techniques of the instant invention may include caustic soda; however, it is generally preferred that caustic soda not be utilized since large quantities are required, thereby increasing processing costs and introducing chloride and sulfate impurities. If caustic soda is introduced into the aqueous solvent, it is very preferred to maintain the NaOH content of the solvent below about 2%.

Certain conventional techniques, including scale prevention additives, defoaming agents, sodium carbonate monohydrate crystal modifiers and other conventional techniques, may be utilized herein including carbon treatment of streams to reduce organic impurities.

Unless otherwise indicated, in this specification and claims, all percentages are in weight percent, all temperatures are in degrees Celsius, and all references to "sodium carbonate" are to $Na_2CO_3$ on a 100% weight basis without reference to water of hydration. Having thus described certain preferred embodiments of the present invention, it is to be understood that the invention is not to be limited by particular details set forth in the above description, as many apparent variations thereof are possible without departing from the spirit or scope of the present invention.

What is claimed is:

1. A process to optimize the recovery of sodium carbonate monohydrate from a mine brine derived by in situ dissolution of an underground sodium bicarbonate ore body, the mine brine containing quantities of sodium bicarbonate comprising:

a. feeding the recovered mine brine to an evaporation-stripping step to concentrate sodium content in the mine brine and to convert at least a portion of sodium bicarbonate therein to sodium carbonate to form a concentrated brine;

b. neutralizing at least a portion of remaining sodium bicarbonate in the concentrated brine to form additional sodium carbonate to form a crystallizable solution having concentrations of sodium carbonate from which monohydrate crystals of sodium carbonate will form upon evaporation of water from the crystallizable solution;

c. feeding the crystallizable solution to a monohydrate crystallizing step in which water is evaporated to form a slurry comprising sodium carbonate monohydrate crystals and a first mother liquor containing dissolved sodium carbonate in a concentration suitable as feed to a sodium carbonate decahydrate crystallization step;

d. separating the sodium carbonate monohydrate crystals from the first mother liquor to form a first mother liquor and to recover monohydrate crystals;

e. feeding at least a portion of the first mother liquor to a sodium carbonate decahydrate crystallization step to crystallize sodium carbonate decahydrate crystals as a slurry in a second mother liquor;

f. separating the sodium carbonate decahydrate crystals from the second mother liquor; and g. recycling the sodium carbonate decahydrate crystals to the monohydrate crystallization step.

2. The process of claim 1, further including the step of feeding an aqueous solvent comprising water to the ore body.

3. The process of claim 1, wherein a portion of the second mother liquor is purged.

4. The process of claim 2, wherein the aqueous solvent contains a mother liquor from a crystallization step of the process.

5. The process of claim 1, wherein a portion of the second mother liquor is recycled to a decahydrate crystallizer.

6. The process of claim 1, wherein the evaporation-stripping step comprises a first stripping step to decompose sodium bicarbonate to carbon dioxide and sodium carbonate followed by an evaporation step to evaporate water to concentrate the sodium values in the concentrated brine without causing crystallization of any crystal species.

7. The method of claim 1, wherein the sodium carbonate monohydrate crystals are converted to soda ash in an elevated temperature drying step.

8. The method of claim 1, wherein formation of burkeite crystals in the monohydrate crystallization step is minimized by controlling the sodium chloride and sodium sulfate content of the first mother liquor below levels from which burkeite crystals are formed.

9. The method of claim 8, wherein the levels of sodium sulfate and sodium chloride in the first mother liquor is less than about 2% by weight sodium sulfate and about 5% by weight sodium chloride.

* * * * *